Nov. 28, 1950        E. C. WEBB        2,531,928
COAL CONVEYER

Filed Feb. 10, 1947        2 Sheets-Sheet 1

INVENTOR

E. C. WEBB

BY    *B.B.Bickenbach*

ATTORNEY

Nov. 28, 1950      E. C. WEBB      2,531,928
COAL CONVEYER

Filed Feb. 10, 1947      2 Sheets-Sheet 2

INVENTOR

E. C. WEBB

BY *[signature]*

ATTORNEY

Patented Nov. 28, 1950

2,531,928

UNITED STATES PATENT OFFICE 2,531,928

COAL CONVEYER

Ernest C. Webb, Bay Village, Ohio, assignor to Iron Fireman Manufacturing Company, Portland, Oreg.

Application February 10, 1947, Serial No. 727,631

6 Claims. (Cl. 198—64)

This invention relates generally to coal conveyors and particularly to the loading or coal pickup sections of coal conveyors of the screw conveyor type.

The main object of this invention is to provide a simple and efficient form of a loading section of a coal conveyor which is easy to install in connection with a coal bin and which can be serviced easily without removing the coal stored over and around the conveyor in the bin.

A second object of this invention is an improvement over any invention of a Fuel Feed Mechanism for Underfeed Stokers fully explained in U. S. Patent No. 1,967,693 issued to me on July 24, 1934 wherein my improvement allows an obstruction to be removed from the coal conveyor without the attendant nuisance of having coal pour from the bin thru the cleanout opening.

A third object of this invention is to minimize the variation in the coal feeding rate of a screw conveyor caused by the segregation by the conveyor of the larger pieces of coal at the discharge end of the loading section of the conveyor.

A fourth object of this invention is to provide a loading section of a coal conveyor with an improved form of end bearing for the conveyor screw whereby packing of coal in the bearing is prevented by continuously cleaning the bearing with the screw and whereby the bearing is provided with a converging entrance to lead the screw into its proper bearing position as the screw is advanced toward the bearing in only approximately its proper alignment with the bearing.

I accomplish these and other objects in a manner set forth in the following specification as illustrated in the following drawings, in which.

Similar numerals of reference refer to the same or similar parts throughout the several views.

Figure 1:
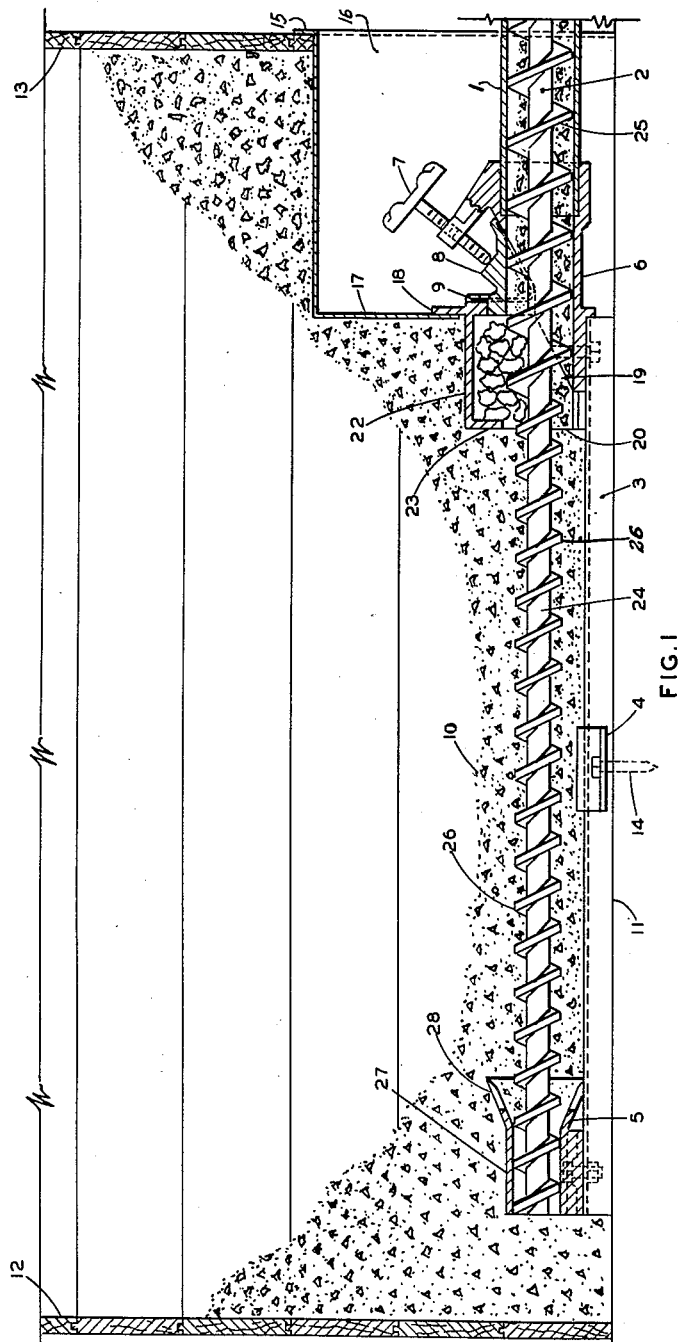
Fig. 1 is a perspective view of my loading section for a coal conveyor.
Figure 2:
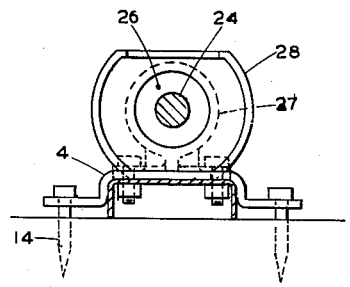
Figure 2 is a vertical section through the loading section of my coal conveyor taken on the rear bearing side of the discharge section and looking towards the rear bearing end.
Figure 3:
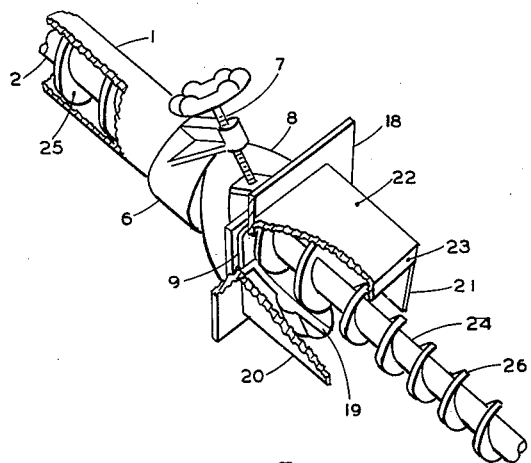
Fig. 3 is a broken away perspective view of the discharge end of my loading section for a coal conveyor.

Referring in detail to the drawings there is shown the loading section of a coal conveyor driven by an electric motor thru a speed reducer of a stoker drive mechanism, not shown, and delivering coal to the burning section of the stoker, not shown, through conveyor housing 1 by means of conveyor screw 2 which also extends through the loading sections which includes base 3, holding strap 4, end bearing 5, discharge casting 6, hand wheel bolt 7, cleanout cover 8, gasket 9 and screw 2.

Shown generally at 10 is a mass of stoker coal in a bin constructed on floor 11 and having rear wall 12, front wall 13, and sides not shown. My conveyor loading section is shown installed in place in the bin and held firmly in place by strap 4 fixed to floor with anchor bolts 14. Flange 15 of sheet metal bin connector 16 is sealed to the front wall of the coal bin while flange 17 of bin connector 16 is sealed to flange 18 of discharge casting 6 of my loading section.

Bin discharge casting 6 includes obstruction guide 19 which with cleanout cover 8, and hand wheel bolt 7 are features of my previous Pat. No. 1,967,693. Casting 6 also includes bin connector flange 18 which cooperates with bin connector 16 to seal my conveyor section to bin wall 13. As part of casting 6 and extending into the bin from flange 18 is a partial housing formed of side members 20 and 21, top member 22, and end baffle 23. The lower side of this housing is partially closed by guide 19. Screw conveyor shown generally as 2 has a continuous core 24, a main flight 25 extending forwardly from baffle 23, and a reduced diameter flight 26 extending rearwardly from baffle 23. Rear bearing 5 has a cylindrical bearing portion 27 and a funnel shaped entrance portion 28.

In operation flight 26 continuously scours the inner bearing surface of part 27 and throughout its exposed length keeps continously filled with coal from mass 10 surrounding the screw. The turning screw advances the coal within the boundary of flight 26 forwardly and tends to roll or tumble the pieces of coal which come into contact with the flight but which have their greater portion outside the boundary of the imaginary cylinder of revolution of the flight. In this way flight 26 tends to agitate the coal in its vicinity, to load with the smaller pieces and to tumble the larger pieces forward. Before the use of my coal conveyor loading section it was common experience to find these larger pieces of coal collected in the bin at the outlet for the conveyor and limiting the discharge capacity of the screw. With my loading section these larger pieces of coal do not accumulate, but as they approach the bin outlet they pass under baffle 23 and between sides 20 and 21 of the partial housing part of casting 6 where they are continuously tumbled and pressed between larger flight 25, flange 18, cover 8, guide 19, sides 20 and 21, top 22, and baffle 23 and thus broken and forced through the bin outlet into the main conveyor housing 1. It is thus seen that my coal conveyor materially reduces the normal tendency for large pieces of coal to accumulate, but rather my loading section urges the larger pieces into a confining space where they are broken up and carried on into the main conveyor.

As clearly covered in my previous Patent No. 1,967,693, should unbreakable pieces of foreign matter, too large in any dimension to pass on into the main conveyor, find their way under baffle 23 the co-operating action of flight 25 and guide 19 is to cause these pieces to be urged upward along guide 19 until they become lodged against the vertical face of cover 8, at which point they will stop the screw 2 from turning and will operate an unloader, not shown, at the stoker transmission, not shown. In this case by manually backing off bolt 7 cover 8 is released and can be lifted out of place thereby exposing and releasing the piece of foreign matter which can then easily be removed. During this operation housing parts 20, 21, 22 and 23 of casting 6 are very advantageous in holding back the coal in the bin from pouring out the cleanout opening when cover 8 is removed.

Occasionally it may be necessary to remove the coal screw 2 from the coal bin for service or examination. With my loading section this can be done with a minimum of trouble for since my coal screw has no fixed connections in the loading section it can readily be screwed out of the coal bin by turning it oppositely from its normal direction of rotation. Here again parts 20, 21, 22 and 23 will prevent the coal from pouring out on the floor should cover 8 and housing 1 be removed. Again in replacing screw 2 into its normal operating position under the coal pile my loading section is advantageous for it is merely necessary to insert screw 2 through casting 6 and while maintaining approximately correct alignment rotate the screw in its normally operating direction. The screw will draw itself back through the coal pile, follow in on funnel 28 and proceed into cylindrical bearing 27 displacing any coal which may have found its way into the space normally occupied by the screw. The open rear end of bearing 27 makes binding of the screw in the bearing practically impossible.

From the foregoing description of my invention it is apparent that I have accomplished the objects stated above and it is apparent that my invention will have utility in other analogous uses and in forms other than that shown. I intend to cover such forms and modifications of my invention as fairly fall within the appended claims.

I claim:

1. A coal stoker of the type having a screw type coal conveyor in which the loading section of said conveyor includes a conveyor screw, an end bearing for said screw, and a bin discharge fitting, said screw having a lesser feeding rate over that part of its length between said end bearing and said fitting than it has over that part of its length within said discharge fitting, said end bearing including a cylindrical section at its end farthest from said fitting and a conical section diverging from its end nearest said fitting, said bin discharge fitting including bearing means for said screw conveyor, means for the segregation of coal and other matter not normally passable through said conveyor means for dressing said nonpassable coal to passable size and means for ready manual elimination of that part of the nonpassable matter which will not dress to passable size.

2. A loading section of a screw type coal conveyor of a coal stoker including a conveyor screw, a bin discharge fitting, and an end bearing for said screw, said end bearing being spaced from said fitting, said conveyor screw having a greater outside diameter over that part of its length within said fitting and a lesser outside diameter over that part of its length between said fitting and said bearing, said smaller diameter flight journaling in said bearing, said bearing having a cylindrical bearing portion open at both ends and a flaring entrance portion at the end of said bearing portion nearest said fitting.

3. A coal stoker of the type having a screw type coal conveyor in which the loading section of said conveyor includes a conveyor screw and a bin discharge fitting, said screw having a greater volumetric capacity throughout that part of its length surrounded by the bin discharge fitting than it does over that part of its length in the loading section not surrounded by the bin discharge fitting, said bin discharge fitting including bearing means for said conveyor screw, obstruction-guiding means whereby foreign matter which does not pass normally through said discharge fitting will be guided to a position within said fitting where it is readily removable, removable cover means for allowing ready access to said segregated foreign matter, and confining means for retaining larger pieces of coal within said bin discharge fitting until said large pieces are broken up by the co-operative action of said screw and said confining means.

4. In a coal burning system, a coal bin and a screw type coal conveyor for removing coal therefrom, said coal bin comprising a boundary wall with a hole therethrough, said coal conveyor extending into said bin through said hole in said wall, said conveyor comprising a conveyor screw and a conveyor housing, said conveyor housing including a bin discharge section, said bin discharge section including flange means formed thereon for sealing said conveyor housing to said wall, said conveyor housing having a wedge shaped opening in the top thereon on the side of said flange away from said bin, said screw extending into said bin beyond the end of said housing, said housing having a roof means formed thereon over said screw and extending toward said bin from said flange whereby coal from said bin is prevented from pouring from said opening.

5. A loading section for a screw type coal conveyer comprising a conveyor screw, a cylindrical conveyor housing, and a rear end bearing for said screw in axial alignment with said housing and spaced therefrom, the front end of said housing being cut off along a plane tilted on a horizontal axis perpendicular to the center line of said conveyor, the extending end of said housing being at the underneath side of said conveyor, an outwardly extending flange formed on said housing perpendicular to its centerline where said plane intersects said centerline, said flange above the centerline of said conveyor having a rectangular opening therein larger than said cylindrical housing, a forwardly extending open bottomed rectangular housing formed on said flange outwardly of said opening, the front opening of said rectangular housing being partially closed by a wall formed downwardly from its top to approximately the level of said cylindrical housing, a wedge shaped cover for the opening at the rear of said flange in said conveyor housing formed by the cut-away section of said cylindrical housing and the opening in said flange, and means co-operating with said conveyor housing to keep said cover in place.

6. In combination, a coal bin and a screw type coal conveyor for removing coal therefrom, said coal bin comprising a boundary wall with a hole therethrough, said conveyor extending into said bin through said hole in said wall and comprising a conveyor housing terminal member flanged for sealing with said wall, an end bearing member secured within said bin in axial alignment with said conveyor housing and spaced therefrom, and a conveyor screw, said bearing member comprising a cylindrical bearing surface open at both ends for supporting the bin end of said screw, said cylindrical bearing surface being joined at its inboard end to a conical surface diverging away from said inboard end for the purpose of guiding the end of said screw into said cylindrical surface as said screw is introduced into said bin through said housing terminal member.

ERNEST C. WEBB.

REFERENCES CITED

The following references are of record in the file of this patent:

UNITED STATES PATENTS

| Number | Name | Date |
|---|---|---|
| 1,882,820 | Haines | Oct. 18, 1932 |
| 2,092,248 | Guthrie | Sept. 7, 1937 |
| 2,123,802 | Ream | July 12, 1938 |
| 2,225,215 | Guthrie | Dec. 17, 1940 |
| 2,233,707 | Nelson | Mar. 4, 1941 |